United States Patent Office 3,790,667
Patented Feb. 5, 1974

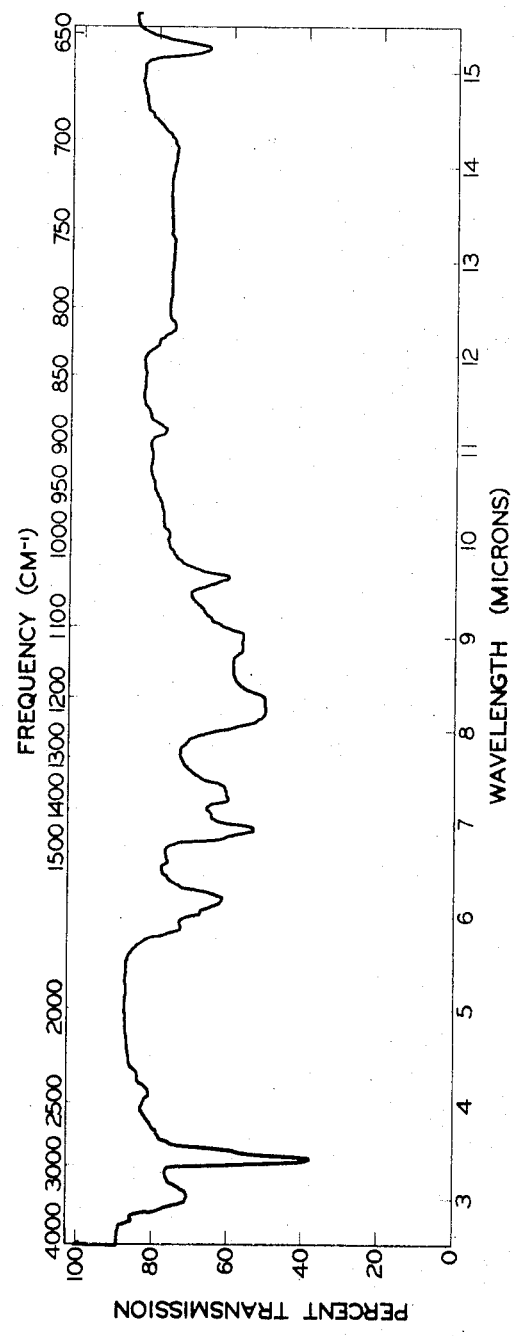

3,790,667
RUMINANT FEED UTILIZATION IMPROVEMENT
Arthur P. Raun, New Palestine, Ind., assignor to Eli
Lilly and Company, Indianapolis, Ind.
Filed Dec. 15, 1972, Ser. No. 315,730
Int. Cl. A61k 21/00
U.S. Cl. 424—115                                  7 Claims

ABSTRACT OF THE DISCLOSURE

Ruminant animals having a developed rumen function and animals which ferment fibrous vegetable matter in the cecum convert their feed more efficiently to energy when orally treated with antibiotic A–201A.

BACKGROUND OF THE INVENTION

Figure 1:
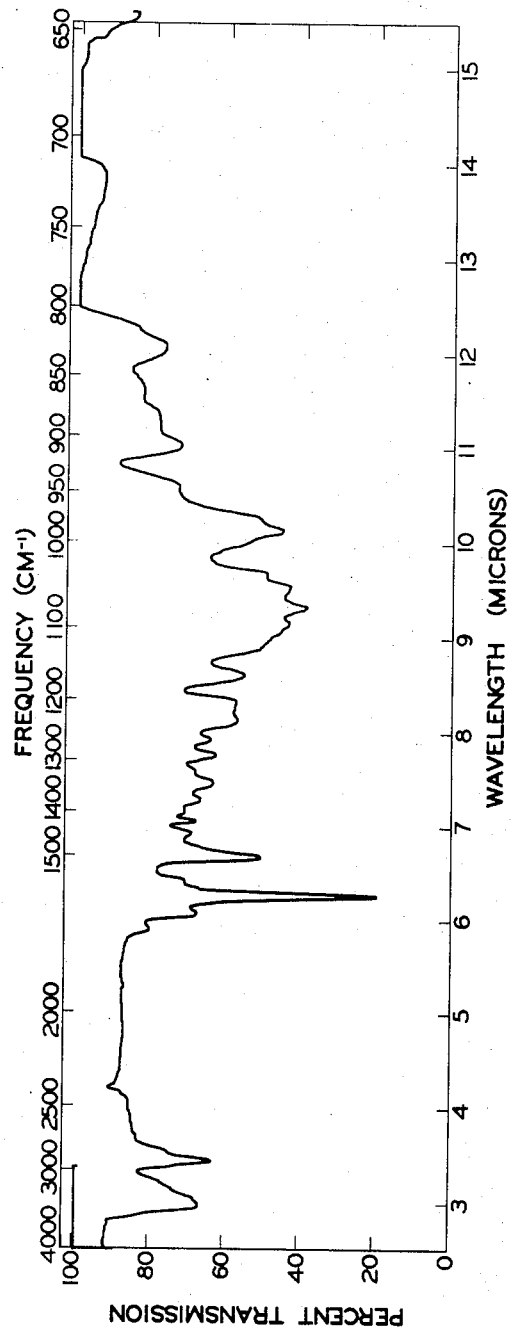

For many years, the animal science industry has tried to increase the efficiency of feed utilization in both ruminant and nonruminant animals. The ruminant animals are of particular economic importance, and so, necessarily, is the efficiency of the utilization of ruminants' feed.

In the course of investigating the efficiency of feed use, the mechanism by which ruminants digest and degrade the components of their feed to form molecules which can be metabolically utilized has been intensively studied. The mechanism of carbohydrate utilization is now well known. Microorganisms in the rumen of the animal ferment the carbohydrate to produce monosaccharides, and then degrade the monosaccharides to pyruvate compounds.

Pyruvate is then metabolized by microbiological processes to either acetate or propionate compounds, which may be either acids or other forms of the radicals. Two acetate radicals may be combined thereafter, still in the rumen, to form butyrates. Leng, "Formation and Production of Volatile Fatty Acids in the Rumen," Physiology of Digestion and Metabolism in the Ruminant (Phillipson et al. ed.), Oriel Press, pp. 408–10.

The animal can utilize butyrate, propionate, and acetate with differing degrees of efficiency. Utilization of these compounds, which are collectively known as volatile fatty acids (VFA), occurs after absorption from the gut of the animal. Butyrate is utilized most efficiently, and acetate the least efficiently. However, the relative efficiency of use of butyrate is negated by the inefficiency of the manufacture of butyrate, which must be made from acetate in the rumen.

One of the major inefficiencies in the rumen is in the manufacture of acetate. Since it is made by the degradation of a pyruvate molecule, each molecule of acetate which is produced is accompanied by a molecule of methane. Most of the methane produced is lost through eructation. Since butyrate is made from two molecules of acetate, each molecule of the relatively efficiently used butyrate involves the loss to the animal of two molecules of methane, with all of the associated energy.

Thus, the efficiency of carbohydrate utilization (carbohydrates being the major nutritive portion of ruminant animals' feed) can be increased by treatments which encourage the animal to produce propionate rather than acetate from the carbohydrates. Further, the efficiency of feed use can be effectively monitored by observing the production and concentration of propionate compounds in the rumen. If the animal is making more propionates it will be found to be using its feed more efficiently.

The relative efficiency of utilization of the VFA's is discussed by McCullough, Feedstuffs, June 19, 1971, p. 19; Eskeland et al., J. Anim. Sci. 33, 282 (1971); and Church et al., Digestive Physiology and Nutrition of Ruminants, vol. 2 (1971), pp. 622 and 625.

It has been well established that the efficiency of feed utilization by a ruminant animal can be readily determined by chemical analysis of the fermentation occurring in the rumen. For example, Marco et al., U.S. Pat. 3,293,038, taught the use of alkylated phenols as feed additives for improved feed efficiency. They disclosed an in vitro rumen fermentation test, and in vivo animal feeding studies, which were evaluated by chemical analysis of the rumen contents for acetate and propionate.

O'Connor et al., J. Anim. Sci. 30, 812–18 (1970), reported the results of in vitro rumen fermentation tests on a large number of compounds. German Pat. 2,059,407, reported the use of a hemiacetal of chloral and starch as a feed additive which inhibits the formation of methane and produces higher than normal levels of propionic and butyric acids.

Marco et al., U.S. Pat. 3,522,353, taught the use of halogenated acyclic carboxylic acids as feed additives. It was there shown that the compounds produced in vitro increases in propionate production, and also increased feed efficiency in animals fed those compounds. To a similar effect is Erwin et al., U.S. Pat. 3,564,098.

The condition called ketosis is a manifestation of faulty VFA balance, which amounts to a clinical illness. Ruminant animals maintained on a diet which naturally degrades to a high proportion of acetate and low proportion of propionate are likely to suffer from ketosis. Dairy animals are particularly prone to the condition. Under stress, such as the onset of high lactation, too little propionate is available. As a result, more acetate is used leading to a high concentration of ketones in the body and especially in the bloodstream. A treatment for ketosis is to feed propionic acid, a precursor of propionic acid, or glucose, any one of which tends to metabolize to propionate. Clearly, if the rumen could be encouraged to produce more propionate than normal from the diet, ketosis incidence could be reduced.

SUMMARY

This invention relates to a novel method of increasing the efficiency of feed utilization by ruminant animals having a developed rumen function, and by animals which ferment fibrous vegetable matter in the cecum. Antibiotic A–201A is orally administered to the animals whose feed efficiency is to be increased.

DESCRIPTION OF THE PREFERRED EMBODIMENT

This novel method of improving feed utilization by ruminants having a developed rumen function comprises oral administration to the ruminants of an effective amount of antibiotic A–201A.

This invention is useful particularly to ruminants which have a developed rumen function. Young ruminants, basically those still unweaned, funtcion as monogastric animals. They use their simple liquid feeds just as monogastric animals do. As the young ruminants begin to eat solid feed, containing cellulose, starch and other carbohydrates, the function of the rumen begins to develop, and the microbiological population of the rumen begins to build up. After the animal has eaten solid feed for a time, its rumen function reaches its full development and continues to operate throughout the animal's life.

This invention is functional in all of the ruminants, that is, the animals which have multiple stomachs, one of which is a rumen. The economically-important ruminant animals are cattle, sheep, and goats. The method is operable when the feed-utilization-improving compound is fed at rates from about 0.10 mg./kg./day to about 10.0 mg./kg./day. While that range of rates is functional, the preferred range of rates is from about 0.2 to about 2 mg./kg./day.

Antibiotics A–201 (A–201A and A–201B) are produced as fermentation products of an organism which is a strain of *Streptomyces capreolus* Higgens, which organism is on unrestricted deposit under the identifying number NRRL 3817, at the Northern Utilization Research and Development Laboratory, Agricultural Research Service, United States Department of Agriculture, Peoria, Illinois.

*Streptomyces capreolus* Higgens, strain NRRL 3817, can be grown in any one of a number of different culture media. However, for economy of production, maximum yield, and ease of isolation, a multicomponent medium in which several sources of carbohydrate and nitrogen are available is preferable. Carbohydrate is obtained from such sources as dextrins, molasses, glucose, glycerol, and the like. Amino acid mixtures, peptones, and the like are good nitrogen sources, while soybean meal contributes both carbohydrate and nitrogen.

Nutrient inorganic salts are included in the culture media and include the usual salts yielding sodium, potassium, ammonium, calcium, phosphate, sulfate, chloride, bromide, nitrate, carbonate, and like ions. The addition of magnesium and iron salts, preferably as the sulfates, has an especially beneficial effect on the production of the A–201 antibiotic mixture. As is necessary for the growth and development of other microorganisms, essential trace elements should likewise be added to the culture medium for culturing the organism of this invention. Such trace elements are commonly added as impurities incidental to the addition of the other ingredients of the culture medium.

The organism used to produce A–201A and A–201B is capable of growth over a wide pH range. For example, the pH of the various media which can be utilized to culture the organism can range from pH 6.2 to pH 7.2. As is the case with most of the *streptomycetes,* the medium gradually becomes more alkaline and can attain a pH of from about pH 6.5 to pH 8.0 during the growth period. However, the pH at the time of harvest at the end of the growth period is usually about pH 6.8 to pH 7.2.

Small quantities of the A–201 antibiotic mixture can be obtained by shake flask culture. For the production of large amounts of the A–201 antibiotic mixture, however, it is preferred to use submerged aerobic fermentation in large deep tanks. Because there is a time lag associated with the inoculation of large tanks with the spore form of the organism, it is preferable to use a vegetative inoculum when the production of this antibiotic mixture is carried out in such large tanks. Such vegetative inoculum is first grown in shake flasks and then transferred to the larger tanks. The medium used for the growth of the vegetative inoculum can be the same as that employed for large fermentations, but other media can also be employed.

The A–201-producing organism can be grown at temperatures between about 30° C. and about 50° C. Production of the highest yields of the antibiotics appears to occur at a temperature between about 35° C. and 40° C.

The following preparations show in some detail the method of producing antibiotic A–201.

PREPARATION 1

Shake flask fermentation of antibiotic A–201

Spores of *Streptomyces capreolus.* NRRL 3817, were inoculated on a nutrient agar slant having the following composition:

YEAST EXTRACT AGAR

| Ingredient: | Amount |
| --- | --- |
| Glucose | g-- 5 |
| Yeast extract | g-- 10 |
| Agar | g-- 20 |
| Water, distilled | l-- 1 |

The slant was inoculated with the spores of NRRL 3817, and incubated for six days at 30° C. The mature slant cultures were then covered with sterile distilled water and scraped with a sterile loop to loosen the spores. The resulting spore suspension was agitated vigorously to produce a uniform distribution and 1 ml. of the suspension was used to inoculate 100 ml. of a vegetative growth medium having the following composition:

VEGETATIVE INOCULUM MEDIUM

| Ingredient: | Amount |
| --- | --- |
| Dextrose | g-- 15 |
| Soybean meal | g-- 15 |
| Cornsteep solid | g-- 5 |
| $CaCO_3$ | g-- 2 |
| NaCl | g-- 5 |
| Water, tap | l-- 1 |

The vegetative growth medium was sterilized by autoclaving at 120° C. for 30 minutes before inoculation.

The inoculated vegetative medium was grown for 48 hours at 30° C. with continuous shaking on a rotary shaker operating at 250 r.p.m.

One-hundred milliliter portions of a production medium having the same composition as that detailed above for the vegetative inoculum were placed in 500 ml. Erlenmeyer flasks and sterilized at 120° C. for 30 minutes. When cool, the flasks were inoculated with 5 ml. portions of the incubated vegetative medium grown as described in the paragraph above.

The production culture fermentation was shaken for 72 hours at 30° C. on a rotary shaker operating at 250 r.p.m. The pH of the uninoculated medium was approximately 7.0. The pH gradually increased during the period of fermentation and at harvest was about 7.5. The antibiotic activity was extracted from the fermentation broth by procedures well known in the art.

PREPARATION 2

A.—Two-hundred and fifty gallon-tank fermentation of A–201 antibiotics

Spores of *Streptomyces capreolus,* NRRL 3817, were inoculated on a nutrient agar slant having the following composition:

| Ingredient: | Amount |
| --- | --- |
| Glucose | g-- 5 |
| Yeast extract | g-- 10 |
| Agar | g-- 20 |
| Water, distilled q.s. | l-- 1 |

The inoculated slant was incubated at about 30° C. for about five days, and then a small amount of sterile distilled water was added and the surface of the agar scraped gently with a sterile platinum wire loop to loosen the organisms and obtain an aqueous suspension.

One-half ml. of the suspension so obtained was used to inoculate 50 ml. of a sterile vegetative growth medium having the following composition:

| Ingredient: | Amount, g. |
| --- | --- |
| Dextrose | 15 |
| Bactopeptone | 10 |
| Glycerol | 10 |
| Amber ALB [1] | 10 |
| Blackstrap molasses | 5 |
| Nadrisol [2] | 10 |
| Water, distilled q.s. to 1 l. | |

[1] Amber ALB is a tradename designation for a milk-albumin product of Amber Laboratories, Juneau, Wisconsin 55039.
[2] Nadrisol is a tradename designation for a corn distiller's dried solubles product of National Distillers Products Company, New York.

The pH of this growth medium was adjusted to 7.0–7.2 with 5 N sodium hydroxide before sterilization. The pH of the medium was 6.5–6.6 after sterilization. This inoculated vegetative growth medium was grown for 72 hours at about 30° C. with constant agitation on a rotary shaker operating at 250 r.p.m.

A twenty milliliter portion of the thus-prepared vegetative inoculum was inoculated into 400 ml. of a second-stage vegetative growth medium of the same composition as given above. This second-stage inoculum was grown for about 48 hours at 30° C., with constant agitation on a rotary shaker operating at 250 r.p.m.

Forty-two liters of a seed-bump medium constituted as detailed above for the first-stage vegetative growth medium, with 0.2 g. of an antifoam agent added per liter of medium, was sterilized at 120° C. for 30 minutes and added to a fermentation tank. About 400 ml. of the second-stage vegetative inoculum, prepared as above, was added to the seed-bump medium. The fermentation of the seed-bump growth medium was carried on for about 24 hours at about 30° C. with an agitator stirring at the rate of 135 r.p.m. and an aeration rate of 0.65 cubic feet/minute. After about 24 hours of fermentation, about 8.0 liters of the seed-bump tank culture was used to inoculate 250 gallons of a sterile production medium constituted as follows:

| Ingredient: | Percent (w./v.) |
|---|---|
| Antifoam agent | 0.02 |
| Dextrose | 5.00 |
| Soybean grits | 1.50 |
| Blackstrap molasses | 0.30 |
| Calcium carbonate | 0.25 |
| Water, distilled q.s. to | 100.0 |

The fermentation proceeded while the temperature of the fermentation mixture was maintained at about 30° C., with a stirring rate of about 250 r.p.m., and an aeration rate of 14 cubic feet/minute. The fermentation was carried on for about 48 hours, at which time a sterile solution of 472 kg. of dextrose in 42 liters of water was added. The fermentation was continued about another 48 hours, terminated, and the harvest procedures initiated.

B.—Isolation of antibiotic mixture

Nine hundred liters of fermentation broth obtained as described in A above were filtered with the help of 27 kg. of a commercial filter aid (Hyflo super-cel). The filtrate was adjusted to about pH 8.5 with a 5 N solution of sodium hydroxide, and extracted two times with 0.5 volume of chloroform. The chloroform extracts were combined and evaporated to dryness under vacuum. The residue thus obtained was dissolved in 2 liters of methanol, and the insoluble particles were filtered off and discarded. The methanol filtrate was evaporated to dryness under vacuum. The resulting residue was dissolved in 470 ml. of chloroform, and added to 10 liters of petroleum ether, causing a precipitate to form. The precipitate was filtered off, then dried under vacuum to yield 82.6 g. of crude antibiotic A–201 mixture.

C.—Separation of A–201 antibiotic mixture

A chromatographic column of the dimensions 7 cm. x 60 cm. was packed with silica gel (Grace 62, Davison Chemical Col.) slurried in a mixture of 1:1 chloroform and acetone. The chloroform-acetone mixture was drained away allowing the silica gel to pack to its own level. Sixty-three grams of the crude antibiotic A–201 mixture, obtained as described under B above, was dissolved in 500 ml. of chloroform. The chloroform solution of the crude A–201 antibiotic mixture was applied to the top of the column. After the 500 ml. of chloroform had drained from the column, the silica gel bed was washed with 10 liters of a 1:1 chloroform-acetone mixture. The effluent and wash were discarded.

Acetone was then passed through the column and the eluate tested for antibiotic activity. The fractions which contained antibiotic activity were combined and evaporated to dryness under vacuum. The residue thus obtained was taken up in about 500 ml. of acetone. The acetone solution was warmed and then allowed to sit overnight at −20° C. to permit the crystallization of antibiotic A–201A. The crystals were filtered off and dried under vacuum to yield 13.3 grams of antibiotic A–201A having a melting point of about 170–172° C.

The infrared spectrum of A–201A as a crystalline compound in a chloroform solution is shown in FIG. 1 of the accompanying drawings. The observed distinguishable bands in the infrared absorption spectrum over the range of 2.0 to 15.0 microns are as follows: 2.96 (broad), 3.45, 3.53, 5.89, 6.06, 6.26, 6.33, 6.40, 6.67, 6.92, 7.06, 7.15, 7.28, 7.46, 7.60, 7.76, 7.92, 8.10, 8.30, 8.60, 8.87, 9.06, 9.14, 9.32, 9.54, 9.65, 10.12, 10.23, 10.59, 11.01, 11.30, 11.60, and 12.00 microns.

Following the elution of the A–201A antibiotic, an acetone:methanol (9:1) mixture was passed through the column and removed in fractions which were tested for antibiotic activity. All of the eluate fractions which showed antibiotic activity were combined and evaporated to dryness under vacuum at 25° C., to yield about 5 grams of an off-white to light brown oil identified as A–201B antibiotic whose infrared absorption spectrum is shown in FIG. 2.

The experimental example which follows shows that the antibiotic A–201A is effective in the instant novel method.

The effectiveness of this novel method of modifying the ratio of volatile fatty acids produced in the rumen was first proven by means of in vitro tests. The general test method is set forth below.

Example

Rumen fluid was obtained from a steer which has a surgically-installed fistula opening into the rumen. The steer was maintained on a high-grain ration, the composition of which follows:

| | Percent |
|---|---|
| Coarse ground corn | 69.95 |
| Ground corncobs | 10 |
| Soybean meal (50% protein) | 8 |
| Alfalfa meal | 5 |
| Molasses | 5 |
| Urea | 0.6 |
| Dicalcium phosphate | 0.5 |
| Calcium carbonate | 0.5 |
| Salt | 0.3 |
| Vitamin A and $D_2$ premix | 0.07 |
| Vitamin E premix | 0.05 |
| Trace mineral premix | 0.03 |

A sample of rumen fluid was strained through 4 layers of cheesecloth and the filtrate was collected in a vacuum bottle. The particulate matter retained by the cheesecloth was resuspended in enough physiological buffer to return it to the original volume of the rumen fluid, and the suspension was strained as before. The buffer used is described below:

| | G./liter |
|---|---|
| $Na_2HPO_4$ | 0.316 |
| $KH_2PO_4$ | 0.152 |
| $NaHCO_3$ | 2.260 |
| $KCl$ | 0.375 |
| $NaCl$ | 0.375 |
| $MgSO_4$ | 0.112 |
| $CaCl_2$ | 0.038 |
| $FeSO_4 \cdot 7H_2O$ | 0.008 |
| $MnSO_4$ | 0.004 |
| $ZnSO_4 \cdot 7H_2O$ | 0.004 |
| $CuSO_4 \cdot 5H_2O$ | 0.002 |
| $CoCL_2$ | 0.001 |

Cheng et al., J. Dairy Sci. 38, 1225, (1955).

The two filtrates were pooled in a separatory funnel and allowed to stand till particulate matter rose to the top. The clear layer was separated and then diluted 1:1 with the same buffer, and adjusted to pH 7.0.

Ten ml. of the diluted rumen fluid prepared above was placed in a 25 ml. flask with 40 mg. of finely-powdered, high-grain ration, the composition of which was described above. Five mg. of soybean protein was also added per flask. The compound to be tested was weighed out and dissolve in the appropriate solvent, supra. The solution was placed on the fine-powdered ration in each test flask and dried. Four replicate flasks were used for treatment.

Two sets of four untreated control flasks each were also prepared. One set of four flasks was incubated for 15 hours at 38° C. with the test flasks. The other set of four untreated control flasks were zero-time controls, the fermentation in which was stopped as soon as the flasks were prepared by addition of 25 percent metaphosphoric acid to each flask.

Fermentation in the incubated test and control flasks was stopped at the end of 16 hours by addition of 2 ml. of 25 percent metaphosphoric acid to each flask.

All of the samples were allowed to settle, and the supernatant was analyzed by gas chromatographic methods for acetate, propionate, and butyrate.

The analysis for each volatile fatty acid found in the zero-time controls was subtracted from the analyses of the untreated controls and of the test flasks. The resulting values reflect the amount of each VFA produced during the 16 hours fermentation period.

The data below are reported as the ratio of VFA's produced in treated flasks to VFA's produced in untreated control flasks. This method of reporting the data shows most clearly the results of the changes in the chemistry of the rumen brought about by the instant method of feed utilization improvement.

The data are means where a given test has been repeated.

| Compound | Rate, mcg./ml. | Acetate | Propionate | Butyrate |
| --- | --- | --- | --- | --- |
| A-201A | 10 | 0.98 | 1.18 | 0.93 |
|  | 5 | 0.90 | 1.71 | 0.77 |
|  | 1 | 0.94 | 1.28 | 0.87 |
|  | 0.5 | 0.95 | 1.25 | 0.87 |
|  | 0.25 | 0.96 | 1.22 | 0.88 |
|  | 0.2 | 0.97 | 1.37 | 0.83 |
|  | 0.1 | 1.01 | 0.98 | 1.00 |

In this experiment, the data show that the animals' feed utilization has been changed measurably.

Administration of the antibiotic compounds according to this novel method prevents an treats ketosis as well as improves feed utilization. The causative mechanism of ketosis is a deficient production of propionate compounds. A presently recommended treatment is administration of propionic acid or feeds which preferentially produce propionates. It is obvious that the instant novel method, which encourages propionate production from ordinary feeds, will reduce incidence of ketosis.

It has been found that antibiotic A-201A, as used in the present novel method, increases the efficiency of feed utilization in ruminant animals. The easiest way to administer the antibiotic to animals is by mixing the antibiotic in the animal's feed.

However, the antibiotic compounds can be usefully administered in other ways. For example, they can be incorporated into tablets, drenches, boluses, or capsules, and dosed to the animals. Formulation of the antibiotic compounds in such dosage forms can be accomplished by means of methods well known in the veterinary pharmaceutical art. Each individual dosage unit should contain a quantity of the feed-efficiency-improving compound which has a direct relation to the proper daily dose for the animal to be treated.

Capsules are readily produced by filling gelatin capsules with any desired form of the desired antibiotic. If desired, the antibiotic can be diluted with an inert powdered diluent, such as a sugar, starch, or purified crystalline cellulose in order to increase its volume for convenience in filling capsules.

Tablets of the antibiotics useful in this novel method are made by conventional pharmaceutical processes. Manufacture of tablets is a well-known and highly-advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator, as is alginic acid. Surface-active agents such as sodium lauryl sulfate and dioctyl sodium sulphosuccinate are also sometimes used. Commonly-used absorbents again include starch and lactose, while magnesium carbonate is also useful for oily substances. Frequently-used binders include gelatin, gums, starch, dextrin and various cellulose derivatives. Among the commonly-used lubricants are magnesium stearate, talc, paraffin wax, various metallic soaps, and polyethylene glycol.

This novel method can also be practiced by the administration of the antibiotic compound as a slow-pay-out bolus. Such boluses are made as tablets are made, except that a means to delay the dissolution of the antibiotic is provided. Boluses are made to release for length periods. The slow dissolution is assisted by choosing a highly water-insoluble form of the antibiotic. A substance such as iron filings is added to raise the density of the bolus and keep it static on the bottom of the rumen.

Dissolution of the antibiotic is delayed by use of a matrix of insoluble materials in which the drug is embedded. For example, substances such as vegetable waxes, purified mineral waxes, and water-insoluble polymeric materials are useful.

Drenches of the antibiotics are prepared most easily by choosing a water-soluble form of the antibiotic. If an insoluble form is desired for some reason, a suspension may be made. Alternatively, a drench may be formulated as a solution in a physiologically-acceptable solvent such as a polyethylene glycol.

Suspensions of insoluble forms of the antibiotics can be prepared in nonsolvents such as vegetable oils such as peanut, corn, or sesame oil; in a glycol such as propylene glycol or a polyethylene glycol; or in water, depending on the form of the antibiotic chosen.

Suitable physiologically-acceptable adjuvants are necessary in order to keep the antibiotic suspended. The adjuvants can be chosen from among the thickeners, such as carboxymethylcellulose, polyvinylpyrrolidone, gelatin, and the alginates. Many classes of surfactants also serve to suspend antibiotics. For example, lecithin, alkylphenol polyethylene oxide adducts, naphthalenesulfonates, alkylbenzenesulfonates, and the polyoxyethylene sorbitan esters are useful for making suspensions in liquid nonsolvents.

In addition, many substances which affect the hydrophilicity, density, and surface tension of the liquid can assist in making suspensions in individual cases. For example, silicone antifoams, glycols, sorbitol, and sugars can be useful suspending agents.

The suspendable antibiotic may be offered to the animal grower as a suspension, or as a dry mixture of the antibiotic and adjuvants to be diluted before use.

The antibiotics may also be administered in the drinking water of the ruminants. Incorporation into drinking water is performed by adding a water-soluble or water-suspendable form of the desired antibiotic to the water in the proper amount. Formulation of the antibiotic for addition to drinking water follows the same principles as formulation of drenches.

The most practical way to treat animals with the antibiotic compounds useful in this method is by the formulation of the compound into the feed supply. Any type of feed may be medicated with the antibiotic compounds, including common dry feeds, liquid feeds, and pelleted feeds.

The methods of formulating drugs into animal feeds are well known. It is usual to make a concentrated drug premix as a raw material for medicated feeds. For example, typical drug premixes may contain from about 1 to about 400 g. of drug per pound of premix. The wide range results from the wide range of concentration of drug which may be desired in the final feed. Premixes may be either liquid or solid.

The formulation of ruminant feeds, as well as feeds for other animals, containing the proper amounts of the antibiotic compounds for useful treatment is mainly a matter of arithmetic. It is necessary only to calculate the amount of compound which is desired to administer to each animal, to take into account the amount of feed per day which the animal eats and the concentration of antibiotic compound in the premix to be used, and calculate the proper concentration of antibiotic compound in the feed.

All of the methods of formulating, mixing, and pelleting feeds which are normally used in the ruminant feed art are entirely appropriate for manufacturing feeds containing the antibiotic compounds useful in this novel method.

It is not intended that the scope of this invention be limited to any particular formulations or methods of administration. The invention is a method of increasing the efficiency of feed utilization by ruminant animals by the oral administration of certain antibiotics. However the administration may be accomplished, it is regarded as being within the scope of the novel method of increasing the efficiency of feed utilization of ruminant animals.

It is usual to treat economic animals, including ruminants, with a variety of growth promoters, disease-preventives, and disease treatments throughout their lives. Such drugs are often used in combination. This novel method of increasing the efficiency of feed utilization by ruminant animals may be practiced in combination with other treatments.

As has been shown, antibiotic A-201A beneficially alters the production of propionates relative to the production of acetates in the rumen of ruminant animals. The same treatment also benefits monogastric animals which ferment fibrous vegetable matter in the cecum. The monogastric animals here referred to are those which consume fibrous vegetable food and digest at least part of it by microbiological fermentation in the cecum. The cecal fermentation follows a chemical pathway similar to rumen fermentation.

Horses, swine, and rabbits are exemplary animals which digest a part of their food by cecal fermentation. The overall feed utilization of such animals is improved by the oral administration of A-210A which causes a beneficial change in the propionate/acetate ratio. Horses and rabbits are exemplary of animals in which cecal fermentation is a major part of the total digestive process, and in which antibiotic A-201A is accordingly particularly beneficial.

I claim:

1. A method of increasing the efficiency of feed utilization by ruminant animals having a developed rumen function which comprises the oral administration to such animals of a propionate-increasing amount of the antibiotic A-201A.

2. The method of claim 1 wherein the ruminant animals are cattle.

3. The method of claim 1 wherein the ruminant animals are sheep.

4. The method of claim 1 in which the antibiotic is administered at a rate of from about 0.10 mg./kg./day to about 10.0 mg./kg./day.

5. The method of claim 1 in which the antibiotic is administered at a rate of from about 0.2 mg./kg./day to about 2.0 mg./kg./day.

6. The method of claim 4 in which the ruminant animals are cattle.

7. The method of claim 4 in which the ruminant animals are sheep.

References Cited

Wallace—J. of Animal Science, vol. 31, December 1970, pp. 1118–1120.

SAM ROSEN, Primary Examiner